United States Patent [19]
Okada

[11] Patent Number: 5,673,149
[45] Date of Patent: Sep. 30, 1997

[54] OPTICAL APPARATUS HAVING A FUNCTION OF PREVENTING IMAGE BLUR OR SHAKE AND HAVING LENS BARRELS OF DIFFERENT DIAMETERS

[75] Inventor: Tadanori Okada, Yokohama, Japan

[73] Assignee: Canon Kabushiki Kaisha, Tokyo, Japan

[21] Appl. No.: 350,099

[22] Filed: Nov. 29, 1994

[30] Foreign Application Priority Data

Dec. 1, 1993 [JP] Japan .................. 5-301739

[51] Int. Cl.[6] .................. G02B 7/02; G02B 27/64
[52] U.S. Cl. .................. 359/557; 359/554; 396/52; 396/55
[58] Field of Search .................. 359/554–557, 359/696–706, 808, 891, 813, 823, 814, 824; 354/195.1–195.12, 202, 430, 70; 396/52–55

[56] References Cited

U.S. PATENT DOCUMENTS

| | | | |
|---|---|---|---|
| 3,434,771 | 3/1969 | Alvarez | 359/557 |
| 4,911,541 | 3/1990 | Alvarez et al. | 359/557 |
| 5,172,276 | 12/1992 | Ueyama et al. | 359/813 |
| 5,266,988 | 11/1993 | Washisu | 354/70 |
| 5,398,132 | 3/1995 | Otani | 359/557 |
| 5,523,892 | 6/1996 | Yoshibe et al. | 396/52 |
| 5,592,335 | 1/1997 | Oui et al. | 359/695 |
| 5,602,675 | 2/1997 | Okada | 396/55 |

*Primary Examiner*—Thong Nguyen
*Attorney, Agent, or Firm*—Fitzpatrick, Cella, Harper & Scinto

[57] ABSTRACT

An optical apparatus having a first lens barrel member, a second lens barrel member having a larger diameter than a diameter of said first lens barrel member, an optical unit held by the second lens barrel member, and an image shake prevention optical device for preventing the image shake. The image shake prevention optical device is fixedly held on at least one of the first and second lens barrel members between the optical unit and the first lens barrel member, and at least at a stepped portion formed by the first and second lens barrel members formed due to the difference between the diameters of the same. In this apparatus, a space formed along the second lens barrel member having a larger diameter can be efficiently utilized to arrange the image shake prevention optical device.

50 Claims, 2 Drawing Sheets

OPTICAL APPARATUS HAVING A FUNCTION OF PREVENTING IMAGE BLUR OR SHAKE AND HAVING LENS BARRELS OF DIFFERENT DIAMETERS

BACKGROUND OF THE INVENTION

1. Field of the Invention

The present invention relates to an optical apparatus having a function of preventing an image blur or shake due to a camera shake or the like.

2. Description of the Related Art

As means for preventing a photography failure due to a camera shake, various methods have been proposed in which vibration caused by a camera shake is detected and a correction lens is displaced according to the detected vibration value to correct a change in the optical axis of an image.

Various correction methods are possible, including, for example, a method of translating a part of or an entire photographing optical system in a direction across the optical axis thereof, a method of moving the optical system so as to incline the optical system, a method of simultaneously performing the operations of translating and moving the optical system in these manners, and a method of inclining a bundle of rays by using a variable apex angle prism.

When a shake correction mechanism based on some of these methods is incorporated in an imaging lens unit for a still camera or a video movie camera, it is necessary to reduce the size of the shake correction mechanism in order to limit the increase in the overall size of a lens barrel.

An electromagnetic motor, a moving coil or the like is used as an actuator for moving a correction lens. For an increase in the driving efficiency of such a device required to reduce the power consumption, it is necessary to increase the number of coil turns or to increase the magnetic force of a magnet. Thus, the size of the mechanism is liable to increase.

Conventionally, in the case of providing a shake correction mechanism for a zoom lens, the space for disposing the shake correction mechanism is limited because the zoom lens has a larger number of movable lenses in comparison with a single focus lens and because the number of components in the entire lens barrel construction is therefore large. A lens and other members to be moved for shake correction are usually determined according to the space for the mechanism. That is, a shake correcting drive means is disposed in a space defined inside a zoom cam cylinder and a fixed lens barrel, the diameter of which cannot be reduced below a certain value determined by the size of a diaphragm, and a correction lens disposed in the vicinity of the diaphragm is moved for correction.

In the above-described conventional correction system, it is necessary to dispose a shake correction mechanism inside a cam cylinder and a fixed lens barrel, and the space for a means for driving a shake correcting lens is therefore limited, so that the shake correction range is restricted. If a smaller drive means is arranged to generate a stronger driving force such that the response to a camera shake is improved, it consumes a larger amount of electric power and necessitates frequent changes of a battery provided as a power source.

SUMMARY OF THE INVENTION

According to one aspect of the present invention, there is provided an optical apparatus comprising a first lens barrel member, a second lens barrel member having a larger diameter than a diameter of said first lens barrel member, an optical unit held by the second lens barrel member, and image shake prevention optical means for preventing the image shake, the image shake prevention optical means being fixedly held on at least one of the first and second lens barrel members between the optical unit and the first lens barrel member, and at least at a stepped portion formed by the first and second lens barrel members due to the difference between the diameters of the same.

In this arrangement, a vacant space formed along the second lens barrel member having a larger diameter can be utilized to efficiently arrange the image shake prevention optical means.

According to another aspect of the present invention, there is provided an optical apparatus comprising a first lens barrel member, a second lens barrel member having a larger diameter than a diameter of said first lens barrel member, and image shake prevention optical means for preventing the image shake by moving an optical member along a predetermined flat plane, the image shake prevention optical means being fixedly held on at least one of the first and second lens barrel members and at least at a stepped portion formed by the first and second lens barrel members due to the difference between the diameters of the same.

This arrangement ensures that the image shake prevention optical means for preventing image shaking by moving the optical member along a predetermined flat plane can be efficiently arranged inside the lens barrel assembly.

DESCRIPTION OF THE PREFERRED EMBODIMENT

Figure 1:
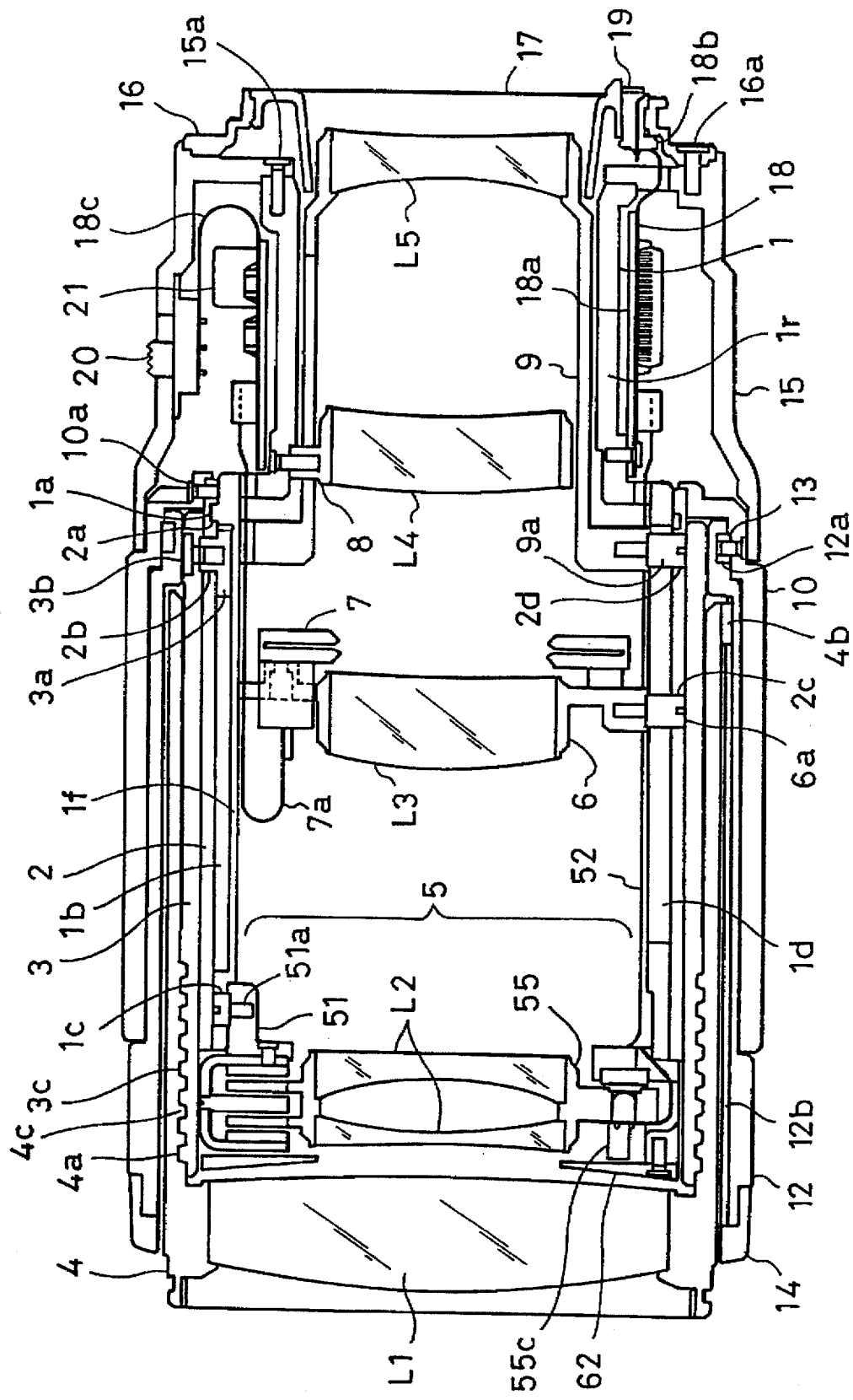
FIG. 1 is a cross-sectional view of a zoom lens representing a first embodiment of the present invention.
Figure 2:
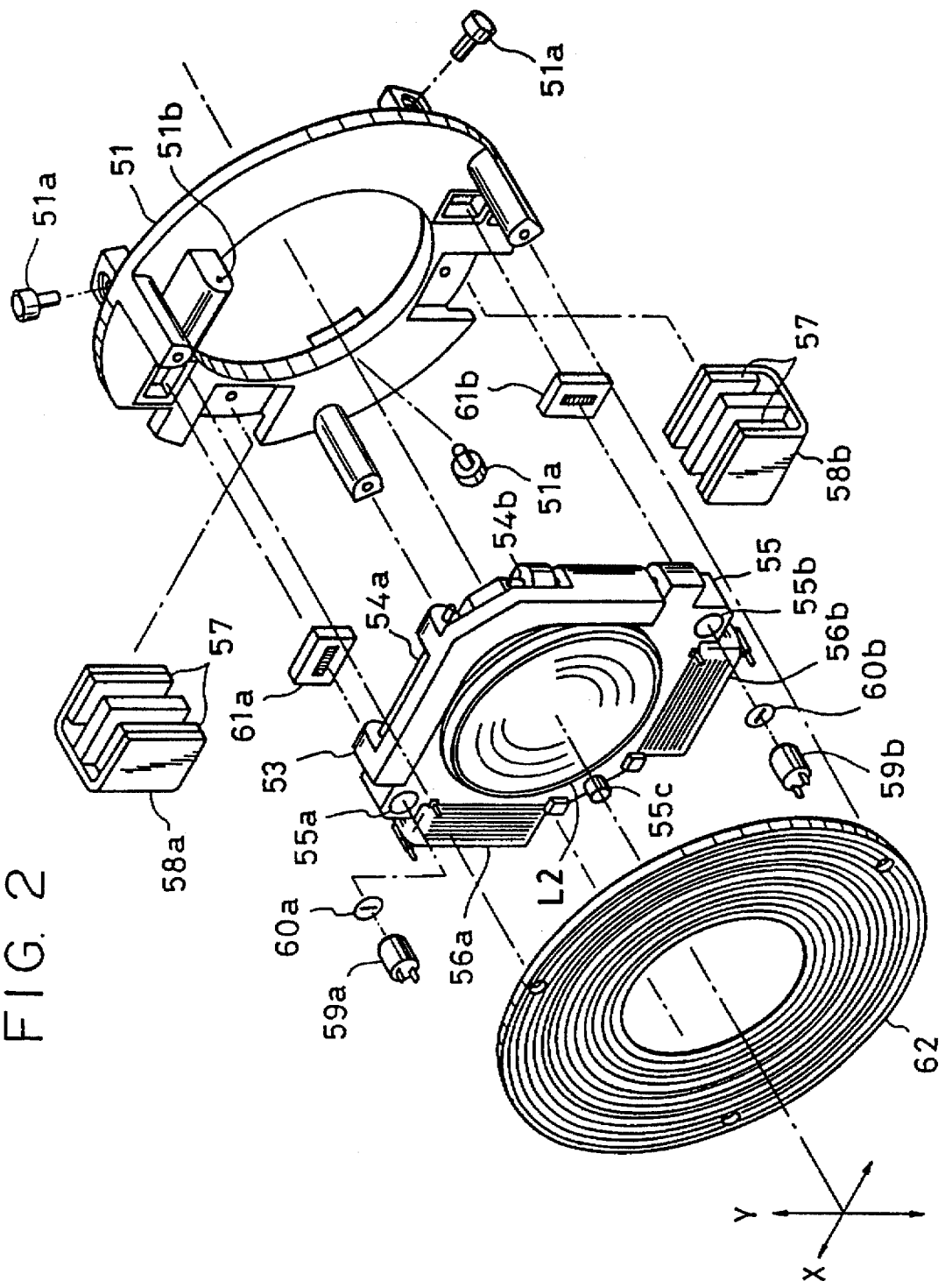
FIG. 2 is an exploded perspective view of a camera shake correction unit shown in FIG. 1.

FIGS. 1 and 2 show an embodiment of the present invention. FIG. 1 is a cross-sectional view of a zoom lens barrel assembly, and FIG. 2 is an exploded perspective view of a shake correction unit incorporated in the lens barrel assembly shown in FIG. 1.

Referring to FIG. 1, a fixed barrel 1 is provided which has a front large-diameter portion 1f and a rear small-diameter portion 1r, and a cam cylinder 2 is positioned outside the fixed barrel 1. The cam cylinder 2 is held so as to be rotatable in a fixed position on an optical axis in a bayonet connection manner such that a circumferential groove 2a formed in an inner circumferential surface of its rear portion is engaged with a projection 1a provided on the fixed barrel 1. A rectilinearly-movable cylinder 3 has three keys 3a fixed to its rear-end inner-circumferential portion by stepped screws 3b at three positions equally spaced apart from each other in the circumferential direction. The keys 3a are engaged simultaneously with rectilinear grooves 1b formed in the fixed barrel 1 and with a first-group cam slit 2b formed in the cam cylinder 2 to enable the rectilinearly-movable cylinder 3 to move along the optical axis by the rotation of the cam cylinder 2. The position of the cylinder 3 shown in FIG. 1 corresponds to a wide angle state of the zoom lens. For zooming to a telephoto position, the rectilinearly-movable cylinder 3 is extended forward.

A male helicoid 3c is formed in a front outer circumferential portion of the rectilinearly-movable cylinder 3. The male helicoid 3c is engaged with a female helicoid 4a formed in an inner circumferential portion 4c of a first-group lens barrel 4 to which a first-group lens L1 is fixed. That is, when the first-group lens barrel 4 is rotated, the first-group lens L1 is moved along the optical axis together with the first-group lens barrel 4 by the helicoid mechanism. In this embodiment, zooming is performed by largely moving the first-group lens L1 in accordance with the movement of the rectilinearly-movable cylinder 3, and focusing is performed by moving the first-group lens L1 at a smaller rate by the rotation of the first-group lens barrel 4.

A shake correction unit 5 described later in detail is fixed on the fixed barrel 1 by engaging rollers 51a, attached to a unit body 51, with attachment holes 1c formed in the fixed barrel 1. The shake correction unit 5 is disposed in front of the fixed barrel 1 in this manner to enable the shake correction unit 5 to be increased in size in a diametrical direction relative to the inside diameter of the fixed barrel 1. Second-group lenses L2, which are not moved for zooming along the optical axis, are held on the shake correction unit body 51 so as to be movable relative to the unit body 51 along a plane perpendicular to the optical axis to provide shake correction.

As depicted in FIG. 1, portion 4c has a larger diameter than that of front large-diameter portion 1f of fixed barrel 1. First-group lens barrel 4 (including portion 4c thereof) extends towards the front of the lens barrel assembly past the front end of portion 1f of fixed barrel 1; accordingly, a stepped portion is thereby formed by the difference between the diameters of portion 1f and portion 4c. Such a construction thereby affords additional space in a diametrical direction for shake correction unit 5, which is disposed in front of the fixed barrel 1.

A third-group lens L3 is fixed to a third-group lens barrel 6. A well-known electromagnetic diaphragm unit 7 is also fixed and supported on the third-group lens barrel 6. The third-group lens barrel 6 has three rollers 6a arranged in a circumferential direction. The rollers 6a are engaged simultaneously with a rectilinear slit 1d formed in the fixed barrel 1 and with a third-group cam slit 2c formed in the cam cylinder 2. A fourth-group lens L4, which is not moved for zooming, is fixed to a fourth-group lens barrel 8, which is in turn fixed to the small-diameter portion 1r of the fixed barrel 1 by screws. A fifth-group lens barrel 9 holds a fifth-group lens L5 and has three rollers 9a on an outer circumferential surface of its front flange portion. The rollers 9a are engaged simultaneously with the rectilinear slit 1d of the fixed barrel 1, along with those of the third-group lens barrel 6, and with a fifth-group cam slit 2d formed in the cam cylinder 2. Accordingly, by moving the cam cylinder 2, the first-group, third-group and fifth-group lenses L1, L3 and L5 are simultaneously moved to perform zooming.

A zoom operation ring 10 is fixed at its rear end to the cam cylinder 2 by screws 10a to integrally rotate the cam cylinder 2 when operated.

A focusing ring 12 is held so as to be only rotatable about the optical axis. That is, a piece 13 fixed to an inner circumferential portion of the zoom operation ring 10, and a circumferential groove 12a formed in the focusing ring 12, are engaged with each other to allow the focusing ring 12 to rotate relative to the zoom operation ring 10 while being maintained in a fixed position.

A rectilinear groove 12b is formed in an inner circumferential surface of the focusing ring 12 and is engaged with a key portion 4b provided on a rear-end outer circumferential portion of the first-group lens barrel 4. The focusing ring 12 and the first-group lens barrel 4 are thereby connected only in the rotational direction, and there is no influence upon the focusing ring 12 when the first-group lens barrel 4 is moved along the optical axis by a zooming operation.

A reinforcement ring 14 made of a metallic material is attached and fixed to the focusing ring 12 after setting the first-group lens barrel 4 inside the focusing ring 12. The reinforcement ring 14 serves to close the opening of the rectilinear groove 12b in a front surface of the focusing ring 12 as well as to prevent the focusing ring 12 from being deformed to such an extent that the focusing ring 12 is difficult to move.

A casing ring 15 is fixed at its rear end to the fixed barrel 1 by screws 15a. A mount for attachment to a camera body (not shown) is fixed to the casing ring 15 by screws 16a. A back cover 17 is fixed on the mount 16 by utilizing its elasticity. The back cover 17 serves to cover internal portions of the lens barrel assembly and to shut off stray light.

A flexible printed circuit board with mounted electrical parts, hereinafter mounted parts assembly 18, for controlling the operation of driving the above-mentioned diaphragm unit 7 and the shake correction unit 5 is fixed by being attached to a polygonal circuit board supporting base 18a by a double coated adhesive tape, and the supporting base 18a is fixed to an outer circumferential portion of the small-diameter portion 1r of the fixed barrel 1 by screws. A connection member 18b extends from the circuit board at the rear of the mounted parts assembly 18 and is electrically connected to contact parts 19 for communication with an electrical unit in the camera body. Electric power for driving the diaphragm unit 7, the shake correction unit 5 and for the control circuit is also supplied from the camera body through the contact parts 19 and the connection member 18b. A flexible printed circuit board 7a is provided for electrical connection between the diaphragm unit 7 and the mounted parts assembly 18. The flexible printed circuit board 7a is disposed by bending its front portion into a U-like shape to ensure stable electrical connection even when the diaphragm unit 7 is moved for zooming along the optical axis. The flexible circuit board 7a is connected at its rear end to a connector in the mounted parts assembly 18.

A flexible printed circuit board 52 is provided for electrical connection between the shake correction unit 5 and the mounted parts assembly 18. Circuit board 52 is connected at its front end to means for driving the second-group lenses L2, for shake correction and to means for detecting the position of the second-group lenses L2 and is connected at its rear end to a connector in the mounted parts assembly 18. A switch 20 for starting or stopping the control for shake correction is attached to the casing ring 15 so as to be operable from the outside. The switch 20 has a communication line to the control circuit through a connection member 18c extending from the mounted parts assembly 18.

Two vibration sensors 21 for detecting a camera shake or the like caused by a user's movement are provided. In this embodiment, a vibration gyroscope is used as each vibration sensor 21 to detect angular velocity. The two sensors 21 are respectively fixed on a top side and a lateral side of the mounted parts assembly 18 in order to detect rotational vibration of the camera in a longitudinal direction (pitching direction) and rotational vibration in a horizontal direction (yawing direction) when the lens barrel assembly is mounted on the camera body. Each sensor 21 is electrically connected to a vibration proofing control circuit formed in the mounted parts assembly 18. A sensor output is converted into an angular displacement by the vibration proofing circuit, and an eccentricity of the correction lens is calculated from this quantity and additional information such as focal distance information and object distance information to be used for the drive control.

The construction of the shake correction unit 5 will next be described with reference to FIG. 2. A member 51 shown in FIG. 2 forms a unit body of the correction unit, and the rollers 51a are respectively fixed at three positions on the unit body 51 equally spaced apart from each other in the circumferential direction. The rollers 51a are engaged with the attachment holes 1c formed in the fixed barrel 1 (as depicted in FIG. 1), thereby supporting the entire shake correction unit 5.

A connection arm 53 is supported by a pin 54a so as to be movable in a horizontal direction (hereinafter referred to as the "X direction"). A pin 54b is fixed on the connection arm 53 so as to extend in a vertical direction (hereinafter referred to as the "Y direction"). An eccentric frame 55 is supported by the pin 54b so as to be movable in the Y direction. The pin 54a is fixed in a pin hole 51b of the unit body 51. Thus, the eccentric frame 55 is supported so as to be movable in each of the X and Y directions relative to the unit body 51. To inhibit the eccentric frame 55 from moving in a direction along the optical axis (Z direction), projections 55c are provided on front and rear surfaces of the eccentric frame 55 and are brought into contact with a front surface of the unit body 51 and a rear surface of a shading plate 62 described later.

Voice coils 56a and 56b are fixed by bonding on the eccentric frame 55 to drive the eccentric frame 55 in X and Y directions. Yokes 58a and 58b to which magnets 57 are bonded are fixed to the unit body 51 by screws at positions corresponding to the voice coils 56a and 56b.

A pair of infrared emitting diodes 59a and 59b are provided as light emitting devices in a means for detecting the eccentricity of the eccentric frame 55 and are fitted and fixed in holes 55a and 55b, respectively, of the eccentric frame 55 together with slit plates 60a and 60b, respectively. As other devices in the eccentricity detecting means, a pair of position sensitive diodes (PSD) 61a and 61b are fixed on the unit body 51.

The shading plate 62 is fixed to front end portions of the unit body 51 by screws. Shading lines are formed in the front surface of the shading plate 62. The shading plate 62 serves to limit an effective bundle of rays upon the front lens surface and to cut stray light to the PSDs 61a and 61b when the eccentricity of the correction lens is detected for shake correction.

Generally, for a reduction in power consumption at the time of shake correction, the driving efficiency may be improved by increasing the number of coil turns and/or the magnetic force of the magnet. For such an effect, it is necessary to increase the overall size of the coil or to reduce the thickness of coil wires. On the other hand, for an increase in shake correction range, an increase in the overall size of the lens barrel assembly, a reduction in the size of the driving means and/or a change in optical properties of the correction lens are required. If the size of the driving means is reduced, the power consumption is increased. If an optical property is changed, the influence of the mechanical accuracy and aberrations of the lens are liable to increase. The methods of changing these properties or factors are therefore undesirable.

Consequently, a substantially large size of the correction lens driving means is required with respect to the power consumption as well as to the shake correction range. In this embodiment, coils (e.g., 54a and 54b) and yokes (e.g., 58a and 58b) having substantially large sizes are used as driving means, and, in order to maximize a mechanism space for disposing the driving means, the yokes (e.g., 58a and 58b) are disposed apart from the fixed barrel 1 and the cam cylinder 2 in a direction along the optical axis so as to avoid interference therebetween. That is, the fixed barrel 1 and the member rotated in fixed positions, i.e., the cam cylinder 2, are shifted along the optical axis from the position at which the correction lens driving means is to be placed, and a vacant space thereby formed is also utilized as a mechanism space for the driving means. As a result, the mechanism space for the driving means can be increased to allow an increase in the size of the driving means without increasing the overall size of the zoom lens assembly. It is thus possible to realize a shake correction unit having improved driving efficiency with low power consumption while maintaining the desired shake correction range. Since electric power for the shake correction unit and the diaphragm unit is supplied from a battery in the camera body, reducing the power consumption for shake correction is effective in extending the life of the battery.

In the above-described embodiments, both the shake correction unit as an image shake prevention means and the vibration gyroscope as an image shake detection means are provided in an interchangeable lens unit. However, the arrangement may alternatively be such that an image shake prevention means and an image shake detection means are provided in a plurality of separate units combinable with each other and are connected to form an image shake prevention system when the units are combined. (For example, an image shake detection means may be provided in a camera while an image shake prevention means is provided in an interchangeable lens which can be attached to the camera.)

Any image shake detection means, e.g., a displacement or angular displacement sensor, a velocity or angular velocity sensor, or an acceleration or angular acceleration sensor, other than the vibration gyroscope, may be used as long as it can detect an image shake.

The present invention can also be applied to a camera system in which a camera itself has an image shake prevention means, as well as to an interchangeable lens.

Also, any other kind of correction optical means, e.g., a variable apex angle prism or the like, may be used.

In the above-described embodiment, the image shake prevention optical means is fixedly held on the fixed barrel 1 fixed on the lens unit body. However, the image shake prevention optical means may be fixedly held on a different lens barrel or the like (e.g., the first-group lens barrel 4 in the above-described embodiment) movable relative to the main body.

According to the above-described embodiment, a substantially large space is maintained for the mechanism of the shake correction driving means, thereby making it possible to set a large correction range without changing the overall size of the lens barrel assembly. Further, the power consumption can be reduced and the driving efficiency can be improved. It is therefore possible to extend battery life if a battery is used as a power source for the correction means.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structure and functions.

What is claimed is:

1. An optical apparatus having a function for preventing image shake, said apparatus comprising:
   a first lens barrel member;
   a second lens barrel member having a larger diameter than a diameter of said first lens barrel member, said first and second lens barrel members being capable of moving relative to each other in a direction of the optical axis;
   an optical unit held by said second lens barrel member; and
   an image shake prevention unit including an image shake prevention optical member for preventing image shake, and a holding member for movably holding said image shake prevention optical member, said image shake prevention unit being fixedly held on at least one of said first and second lens barrel members between said optical unit and said first lens barrel member, and at least at a stepped portion formed by said first and second lens barrel members due to a difference between the diameters of said lens barrel members.

2. An apparatus according to claim 1, wherein said image shake prevention unit is fixedly held on said first lens barrel member.

3. An apparatus according to claim 2, wherein said first lens barrel member is fixedly held on said apparatus.

4. An apparatus according to claim 1, wherein said second lens barrel member is movably held on said apparatus.

5. An apparatus according to claim 1, wherein said optical unit is positioned on a front side of said first lens barrel member in a direction along an optical axis of said apparatus, and said image shake prevention unit is positioned at a rear side of said optical unit in the direction along the optical axis, on a front side of said first lens barrel member in the direction along the optical axis, and inside said second lens barrel member in a diametrical direction.

6. An apparatus according to claim 5, wherein said image shake prevention unit is fixedly held on a portion of said first lens barrel member in the direction along the optical axis.

7. An apparatus according to claim 1, wherein said image shake prevention unit is larger in a diametrical direction than an inside diameter of said first lens barrel member and is smaller in the diametrical direction than an inside diameter of said second lens barrel member.

8. An apparatus according to claim 1, wherein said image shake prevention unit comprises a movable optical member and drive means for moving the movable optical member.

9. An apparatus according to claim 8, wherein said optical member comprises means for moving along a predetermined flat plane.

10. An apparatus according to claim 9, wherein said optical member comprises means for moving along a plane substantially perpendicular to an optical axis of said apparatus.

11. An apparatus according to claim 1, wherein said second lens barrel member comprises means for moving together with said optical unit relative to said first lens barrel member in a direction along an optical axis of said apparatus.

12. An apparatus according to claim 11, wherein each of said second lens barrel member and said optical unit comprises respective means for moving to perform at least one of focusing and changing a focal distance.

13. An apparatus according to claim 1, wherein said apparatus is a lens unit for imaging.

14. An optical apparatus having a function for preventing image shake, said apparatus comprising:
    a first lens barrel member;
    a second lens barrel member having a larger diameter than a diameter of said first lens barrel member, said first and second lens barrel members being capable of moving relative to each other in a direction of the optical axis;
    an optical unit held by said second lens barrel member; and
    an image shake prevention unit including an image shake prevention optical member for preventing image shake, and a holding member for movable holding said image shake prevention optical member, said image shake prevention unit being fixedly held on at least one of said first and second lens barrel members between said optical unit and said first lens barrel member, and at least at a stepped portion formed by said first and second lens barrel members due to a difference between the diameters of said lens barrel members.

15. An apparatus according to claim 14, wherein said image shake prevention unit is fixedly held on said first lens barrel member.

16. An apparatus according to claim 15, wherein said first lens barrel member is fixedly held on said apparatus.

17. An apparatus according to claim 15, wherein said second lens barrel member is movably held on said apparatus.

18. An apparatus according to claim 14, wherein said image shake prevention unit is positioned on a front side of said first lens barrel member in a direction along an optical axis of said apparatus and inside said second lens barrel member in a diametrical direction.

19. An apparatus according to claim 18, wherein said image shake prevention unit is fixedly held on a portion of said first lens barrel member at a front end of said first lens barrel member in the direction along the optical axis.

20. An apparatus according to claim 18, wherein said image shake prevention unit is larger in a diametrical direction than an inside diameter of said first lens barrel member and is smaller in a diametrical direction than an inside diameter of said second lens barrel member.

21. An apparatus according to claim 14, wherein said image shake prevention unit comprises a movable optical member and drive means for moving the movable optical member.

22. An apparatus according to claim 14, wherein said second lens barrel member comprises means for holding an optical unit and means for moving together with the optical unit relative to said first lens barrel member in a direction along an optical axis of said apparatus.

23. An apparatus according to claim 22, wherein each of said second lens barrel member and said optical unit comprises respective means for moving to perform at least one of focusing and changing a focal distance.

24. An apparatus according to claim 14, wherein said optical member comprises means for moving along a plane substantially perpendicular to an optical axis.

25. An apparatus according to claim 14, wherein said apparatus is a lens unit for imaging.

26. An optical apparatus having a function for preventing image shake, said apparatus comprising:
    a first lens barrel portion;
    a second lens barrel portion having a larger diameter than a diameter of said first lens barrel portion;
    an image shake prevention unit including an image shake prevention optical member for preventing image shake, and a holding member for movably holding said image shape prevention optical member, said image shake prevention unit being fixedly held on at least one of said first and second lens barrel portions at a stepped portion formed by said first and second lens barrel members due to a difference between the diameters of said first and second lens barrel portions, and at a position where said first and second lens barrel portions do not overlap each other in a direction perpendicular to an optical axis.

27. An apparatus according to claim 26, wherein said image shake prevention unit is fixedly held on said first lens barrel portion.

28. An apparatus according to claim 27, wherein said first lens barrel member is fixedly held on said apparatus.

29. An apparatus according to claim 26, wherein said second lens barrel member is movably held on said apparatus.

30. An apparatus according to claim 26, wherein said image shake prevention unit is fixedly held on a portion of said first lens barrel member in the direction along the optical axis.

31. An apparatus according to claim 26, wherein said image shake prevention unit is larger in a diametrical direction than an inside diameter of said first lens barrel member and is smaller in the diametrical direction than an inside diameter of said second lens barrel member.

32. An apparatus according to claim 26, wherein said image shake prevention unit comprises a movable optical member and drive means for moving the movable optical member.

33. An apparatus according to claim 32, wherein said optical member comprises means for moving along a predetermined flat plane.

34. An apparatus according to claim 33, wherein said optical member comprises means for moving along a plane substantially perpendicular to an optical axis of said apparatus.

35. An apparatus according to claim 26, wherein said first lens barrel portion is a part of said first lens barrel member, said second lens barrel portion is a part of said second lens barrel member which is different from said first lens barrel member.

36. An apparatus according to claim 35, wherein the first and second lens members are capable of moving relative to each other in a direction of the optical axis.

37. An apparatus according to claim 36, wherein said first and second lens members move to change or adjust the focal point.

38. An optical apparatus having a function for preventing image shake, said apparatus comprising:
a first lens barrel portion;
a second lens barrel portion having a larger diameter than a diameter of said first lens barrel portion;
an image shake prevention unit including an image shake prevention optical member for preventing image shake and a guiding member for guiding said image shake prevention optical member with a guide path arranged on a predetermined plane, so that said image shake prevention optical member moves in a direction of said predetermined plane along the guide path, said image shake prevention unit being fixedly held on at least one of said first and second lens barrel portions at a stepped portion formed by said first and second lens barrel portions due to a difference between the diameters of said lens barrel portions.

39. An apparatus according to claim 38, wherein said image shake prevention unit is fixedly held on said first lens barrel portion.

40. An apparatus according to claim 38, wherein said first lens barrel member is fixedly held on said apparatus.

41. An apparatus according to claim 38, wherein said second lens barrel member is movably held on said apparatus.

42. An apparatus according to claim 38, wherein said image shake prevention unit is fixedly held on a portion of said first lens barrel member in the direction along the optical axis.

43. An apparatus according to claim 38, wherein said image shake prevention unit is larger in a diametrical direction than an inside diameter of said first lens barrel member and is smaller in the diametrical direction than an inside diameter of said second lens barrel member.

44. An apparatus according to claim 38, wherein said image shake prevention unit comprises a movable optical member and drive means for moving the movable optical member.

45. An apparatus according to claim 44, wherein said optical member comprises means for moving along a plane substantially perpendicular to an optical axis of said apparatus.

46. An apparatus according to claim 38, wherein said first lens barrel portion is a part of said first lens barrel member, said second lens barrel portion is a part of said second lens barrel member which is different from said first lens barrel member.

47. An apparatus according to claim 46, wherein the first and second lens members are capable of moving relative to each other in a direction of the optical axis.

48. An apparatus according to claim 47, wherein said first and second lens members move to change or adjust the focal point.

49. An apparatus according to claim 38, wherein said image shake prevention optical member comprises a contacting portion which contacts said guide path.

50. An apparatus according to claim 38, wherein said guide path comprises a shaft member.

* * * * *

UNITED STATES PATENT AND TRADEMARK OFFICE
CERTIFICATE OF CORRECTION

PATENT NO.   : 5,673,149　　　　　　　　　　　　　Page 1 of 2
DATED        : September 30, 1997
INVENTOR(S)  : TADANORI OKADA It is certified that error appears in the above-identified patent and that said Letters Patent is hereby corrected as shown below:

Column 2

Line 46, "If" should read --1f--.

Column 3

Line 28, "If" should read --1f--.
　　　Line 30, "if" should read --1f--.

Column 9

Line 2, "shape" should read --shake--.
　　　Line 5, "members" should read --portions--.
　　　Line 15, "member" should read --portion--.
　　　Line 17, "member" should read --portion--.
　　　Line 21, "member" should read --portion--.
　　　Line 26, "member" should read --portion--.
　　　Line 27, "member" should read --portion--.
　　　Line 40, "said" should read --a--.
　　　Line 41, "of said" should read --of a--.

UNITED STATES PATENT AND TRADEMARK OFFICE
CERTIFICATE OF CORRECTION

PATENT NO. : 5,673,149

DATED : September 30, 1997

INVENTOR(S) : TADANORI OKADA

It is certified that error appears in the above-identified patent and that said Letters Patent is hereby corrected as shown below:

<u>Column 10</u>

Line 16, "member" should read --portion--.
    Line 18, "member" should read --portion--.
    Line 22, "member" should read --portion--.
    Line 38, "said" should read --a--.
    Line 39, "of said" should read --of a--.

Signed and Sealed this

Twenty-fourth Day of March, 1998

*Attest:*

BRUCE LEHMAN

*Attesting Officer*    *Commissioner of Patents and Trademarks*